(No Model.) 2 Sheets—Sheet 1.
L. K. JEWETT.
ANTI-FRICTION BEARING.
No. 449,078. Patented Mar. 24, 1891.
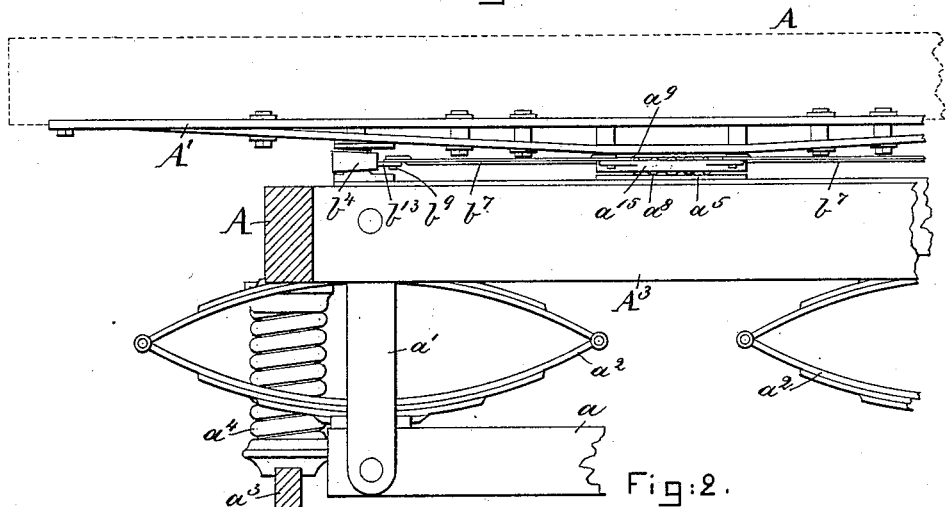
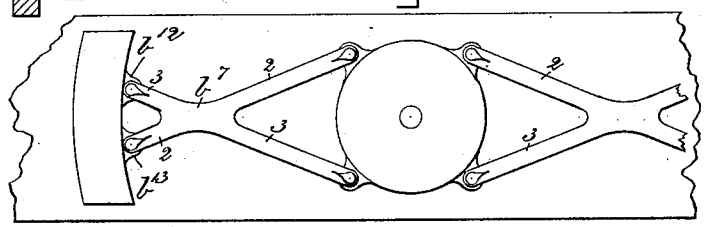
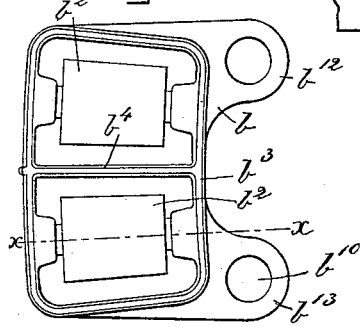
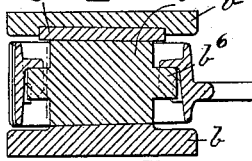
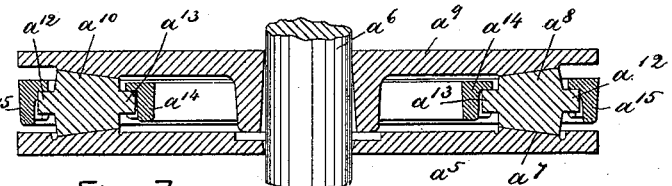
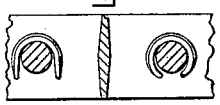
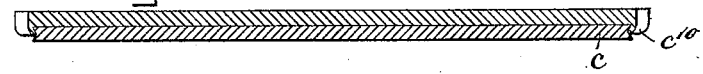
Witnesses.
Fred S. Greenleaf
Frederick L. Emery
Inventor.
Luther K. Jewett,
by Crosby Gregory
attys.

(No Model.) 2 Sheets—Sheet 2.
L. K. JEWETT.
ANTI-FRICTION BEARING.
No. 449,078. Patented Mar. 24, 1891.
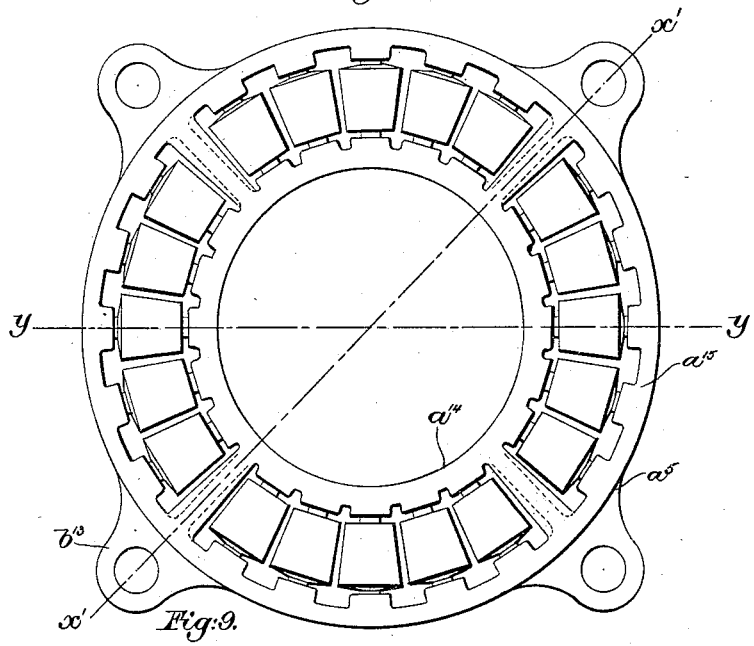
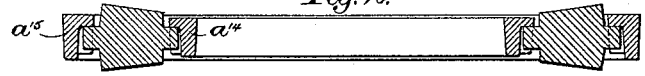
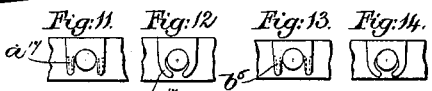
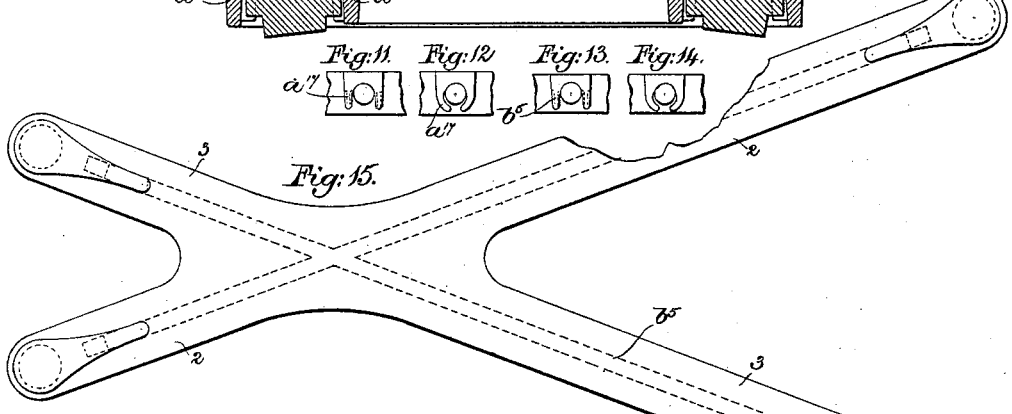
Witnesses:
Fred S. Greenleaf
Frederick L. Emery
Inventor:
Luther K. Jewett,
by Crosby Gregory
Attys.
THE NORRIS PETERS CO., PHOTO-LITHO., WASHINGTON, D. C.

UNITED STATES PATENT OFFICE.

LUTHER K. JEWETT, OF BOSTON, MASSACHUSETTS, ASSIGNOR TO THE JEWETT SUPPLY COMPANY, OF PORTLAND, MAINE.

ANTI-FRICTION BEARING.

SPECIFICATION forming part of Letters Patent No. 449,078, dated March 24, 1891.

Application filed August 11, 1890. Serial No. 361,648. (No model.)

*To all whom it may concern:*

Be it known that I, LUTHER K. JEWETT, of Boston, county of Suffolk, State of Massachusetts, have invented an Improvement in Anti-Friction Bearings, of which the following description, in connection with the accompanying drawings, is a specification, like letters on the drawings representing like parts.

This invention relates to a novel anti-friction bearing, support, or device especially adapted to be used between car-bodies and their car-trucks, and is an improvement upon the anti-friction device substantially such as shown and described in United States Patent No. 427,693, granted to me May 13, 1890.

In the patent referred to the side bearings and the center bearing are independent of each other, and the side bearings are kept in place by means of a rack-bar on the upper and lower curved plate with which meshes a gear on the anti-friction roller.

My present invention has for its object to construct the anti-friction device whereby the rack-bars and gear on the side bearing may be dispensed with and the free and unrestrained rolling motion of the anti-friction device obtained.

Another feature of my invention consists in connecting the center bearing to the side bearings, whereby they may move simultaneously. The bearing-surfaces of the anti-friction device will preferably be provided with a hardened face, whereby the life of the anti-friction support or bearing may be prolonged.

My invention therefore consists in the combination, with an anti-friction center bearing composed of two flat or plane bearing-surfaces and intermediate anti-friction devices provided with arbors, and a spacing-frame movable with the said arbors, of an anti-friction side bearing consisting of an upper and lower bearing-surface and an interposed anti-friction device provided with arbors, a frame movable with said arbors, and an intermediate connection between the said movable frames, substantially as will be described.

Other features of my invention will be pointed out in the claims at the end of this specification.

Figure 1 is a transverse section of a sufficient portion of a car-body and its truck provided with anti-friction devices embodying my invention to enable the said invention to be understood; Fig. 2, a top or plan view, partially broken out, of the car-truck bolster and the anti-friction device supported by it; Fig. 3, a top or plan view of one of the side bearings, spacing-frames, and its rollers; Fig. 4, a transverse section of the side bearing shown in Fig. 3 on line $x\ x$; Fig. 5, a detail to be referred to; Fig. 6, a transverse section of the center bearing; Fig. 7, a longitudinal section of the upper bearing-surface of one of the side bearings; Fig. 8, a top or plan view of the center bearing, spacing-frame, and its rollers; Fig. 9, a transverse section on the line $x'\ x'$, Fig. 8; Fig. 10, a transverse section on the line $y\ y$, Fig. 8; Figs. 11, 12, 13, and 14, details to be referred to; Fig. 15, a top or plan view, on an enlarged scale, of one form of device connecting the center bearing with the side bearing; and Fig. 16, a side elevation of the connecting-bar shown in Fig. 15.

The car-body A, represented by dotted lines, its bolster A', composed, as herein shown, of metal trusses, the car-truck $A^2$, its bolster $A^3$, the swing-plank $a$, suspended from the bolster $A^3$ by the links $a'$, the bolster-sustaining springs $a^2$, the equalizer-bar $a^3$, and equalizer-springs $a^4$ are and may be of any usual or well-known construction and substantially such as shown and described in the patent referred to.

The car-truck bolster $A^3$ has secured to it by bolts or in any other suitable manner the lower surface $a^5$ of the center-bearing, preferably a plate or casting provided with a central opening through which the king-bolt $a^6$ is extended, and preferably having an inclined ridge or track $a^7$, upon which rest anti-friction devices, preferably conically-shaped rollers $a^8$.

The car-body bolster A' has secured to it in usual manner the upper bearing-surface, plate, or casting $a^9$ of the center bearing, the said plate or casting being preferably provided with an inclined track or way $a^{10}$.

The anti-friction conically-shaped rollers $a^8$ of the center bearing, provided with arbors $a^{12}$ $a^{13}$, are separated by a frame composed of two annular rings $a^{14}$ $a^{15}$, united at suitable intervals apart by cross or tie bars $a^{16}$, substantially as in the patent referred to.

The annular rings $a^{14}$ $a^{15}$ of the frame have secured to or forming part of them on their inner sides ears $a^{17}$, which fit over the arbors of the conically-shaped rollers, and which are bent around the said arbors to fit the same loosely; but sufficient to form a locking device to prevent the arbors from falling out from between the ears, so that the said frame and the conically-shaped rollers form practically one part or piece, and may be readily handled without disturbing the said rollers, the bent position of the ears being clearly shown in Fig. 12.

The car-truck bolster $A^3$ at or near the sides of the truck has secured to it anti-friction side bearings, and both side bearings being of like construction I shall specifically describe but one.

The anti-friction side bearing consists of a bottom plate or casting $b$, which is secured to the car-truck bolster, a top plate or casting $b'$, secured to the car-body bolster, and an interposed anti-friction device $b^2$, preferably one or more conically-shaped rollers having arbors.

The anti-friction rollers $b^2$ have co-operating with them a frame composed, as shown in Fig. 3, of side bars $b^3$ and cross-bars $b^4$, the side bars $b^3$, having on their inner sides ears $b^5$, which are normally straight, as shown in Fig. 13; but which are in practice bent around to partially encircle the arbors $b^6$ of the conically-shaped rollers $b$ to form a locking device to prevent the said rollers from becoming detached from the frame.

The frame of each side bearing is preferably joined by an intermediate connection $b^7$ to the spacing-frame of the center bearing, so that the conically-shaped roller or rollers of the side bearing may revolve in unison with the rollers of the center bearing, the said connection being preferably made, as herein shown, after the manner of two bars 2 3, crossing each other obliquely.

The intermediate connection $b^7$ may be fastened to the frames referred to of the center and side bearings in any suitable or desired manner, it being herein shown as secured by means of preferably hollow studs or posts $b^9$ at the ends of the arms 2 3 on their under side, the said posts fitting into suitable holes or sockets $b^{10}$ in ears $b^{12}$ $b^{13}$, secured to or forming part of the side bearing-frame and the center bearing-frame, respectively, the said holes or sockets being of sufficient size to permit of a slight rising and falling of the frame.

The bars 2 3, forming the intermediate connection, are preferably strengthened on their under sides by a rib $b^{15}$. (See dotted lines, Fig. 13, and full lines, Fig. 14.)

In order that the anti-friction bearings may unite lightness with strength, the bearing-surfaces which come in contact with the rollers are preferably made as a steel plate or bar $c$, secured to the under surface of the top bearing-plate and to the upper surface of the lower bearing-plate, only one of such bars or plates $c$ being shown in the upper bearing-surface of the side bearing. (See Fig. 4.) By this means the bearing-surface may be made of steel, and the plate or casting to which it is secured may be made of malleable iron.

It will be noticed that the rollers of the side bearings, as well as the rollers of the center bearing, have a free and natural movement, and are not restricted in their movement between the upper and lower bearing-surfaces, which are made flat or plane. Furthermore, by providing the inner sides of the spacing-frames with ears capable of being bent so as to partially encircle the arbors of the anti-friction rollers the said rollers are readily kept in place and may be easily handled.

I have herein shown the side bearing as provided with two rollers, and while I may prefer to employ a plurality of rollers I do not desire to limit myself to any particular number of rollers, as one or more may be used, and, furthermore, instead of the conically-shaped rollers, I may use balls provided with arbors.

The steel facing or plate $c$ may be secured in place by any suitable means; but I prefer to secure it by means of lips $c^{10}$ on the ends of the bearing-surfaces, the said lips being bent inward, as shown in Fig. 7, to enter a notch in the end of the plate $c$.

In practice the upper bearing-surface of the center and side bearings are preferably made large enough to extend over and beyond the movable frame of the center and side bearings, so as to prevent the intermediate connections $b^7$ from becoming detached from the movable frames of the center and side bearings; but it is evident the said connections may be locked to the said movable frames in any other well-known manner.

I claim—

1. The combination, with an anti-friction center bearing composed of two flat or plane bearing-surfaces and intermediate anti-friction devices provided with arbors, and a spacing-frame movable with the said arbors, of an anti-friction side bearing consisting of an upper and lower bearing-surface and an interposed anti-friction device provided with arbors, a frame movable with said arbors, and an intermediate connection between the said movable frames, substantially as described.

2. In an anti-friction bearing, the combination, with two plane or flat bearing-surfaces, of an interposed anti-friction device provided with arbors, a frame movable with said arbors, and means provided with ears resting upon said arbors to lock the anti-friction device to the said frame, substantially as described.

3. In an anti-friction bearing, the combination, with two plane or flat bearing-surfaces provided with a hardened face c, of an interposed anti-friction device provided with arbors, and a frame movable with said anti-friction device, substantially as described.

4. In an anti-friction bearing, the combination, with two plane or flat bearing-surfaces provided with a hardened face c, of an interposed anti-friction device provided with arbors, and a frame movable with said anti-friction device and provided with ears bent about the arbors to lock the anti-friction device to the frame, substantially as described.

In testimony whereof I have signed my name to this specification in the presence of two subscribing witnesses.

LUTHER K. JEWETT.

Witnesses:
   JAS. H. CHURCHILL,
   EMMA J. BENNETT.